(12) United States Patent
Shen et al.

(10) Patent No.: US 9,860,041 B2
(45) Date of Patent: Jan. 2, 2018

(54) RADIO BASE STATION, USER TERMINAL AND RADIO COMMUNICATION METHOD

(71) Applicant: NTT DOCOMO, INC., Tokyo (JP)

(72) Inventors: Jiyun Shen, Tokyo (JP); Satoshi Suyama, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 8 days.

(21) Appl. No.: 14/916,586

(22) PCT Filed: Sep. 2, 2014

(86) PCT No.: PCT/JP2014/073070
§ 371 (c)(1),
(2) Date: Mar. 4, 2016

(87) PCT Pub. No.: WO2015/033930
PCT Pub. Date: Mar. 12, 2015

(65) Prior Publication Data
US 2016/0197709 A1  Jul. 7, 2016

(30) Foreign Application Priority Data
Sep. 6, 2013 (JP) .................................. 2013-184655

(51) Int. Cl.
*H04L 5/00* (2006.01)
*H04W 16/28* (2009.01)
(Continued)

(52) U.S. Cl.
CPC ......... *H04L 5/0048* (2013.01); *H04B 7/0417* (2013.01); *H04B 7/0617* (2013.01);
(Continued)

(58) Field of Classification Search
CPC .... H04B 7/024; H04B 7/0413; H04B 7/0417; H04B 7/0452; H04B 7/0456;
(Continued)

(56) References Cited

U.S. PATENT DOCUMENTS

2008/0069038 A1* 3/2008 Yamamoto ........... H04B 7/0413
370/328
2008/0225960 A1* 9/2008 Kotecha ............... H04B 7/0413
375/259
(Continued)

FOREIGN PATENT DOCUMENTS

JP 2004-072539 A 3/2004
JP 2011004161 A 1/2011
(Continued)

OTHER PUBLICATIONS

International Search Report issued in corresponding application No. PCT/JP2014/073070 dated Dec. 9, 2014 (3 pages).
(Continued)

*Primary Examiner* — Charles C Jiang
*Assistant Examiner* — Rose Clark
(74) *Attorney, Agent, or Firm* — Osha Liang LLP

(57) ABSTRACT

The present invention is designed so that, in a communication system to employ massive MIMO, data signals to which beamforming is applied can be transmitted adequately. A radio base station transmits a data signal to a user terminal by applying beamforming using a plurality of antenna elements, and has a determining section that determines the type of a weight to apply to the data signal for beamforming, a generating section that generates a reference signal which the user terminal uses in channel estimation, a weight control section that controls weights to apply to transmitting signals, and a transmitting section that transmits the data signal and the reference signal, and the weight control section determines whether or not to apply a weight to the reference signal based on the type of the weight.

12 Claims, 11 Drawing Sheets

(51) Int. Cl.
*H04W 72/04* (2009.01)
*H04W 88/08* (2009.01)
*H04B 7/0417* (2017.01)
*H04B 7/06* (2006.01)

(52) U.S. Cl.
CPC ......... *H04B 7/0626* (2013.01); *H04B 7/0697* (2013.01); *H04W 16/28* (2013.01); *H04W 72/04* (2013.01); *H04W 88/08* (2013.01)

(58) Field of Classification Search
CPC .. H04B 7/0482; H04B 7/0617; H04B 7/0619; H04B 7/0626; H04B 7/0634; H04B 7/0639; H04B 7/068; H04B 7/0689; H04B 7/0695; H04B 7/0697; H04L 2025/03783; H04L 5/0007; H04L 5/0023; H04L 5/0048; H04L 5/006; H04W 16/28; H04W 24/02; H04W 72/04; H04W 72/1226; H04W 88/02; H04W 88/08
See application file for complete search history.

(56) References Cited

U.S. PATENT DOCUMENTS

| | | | | |
|---|---|---|---|---|
| 2010/0238824 | A1* | 9/2010 | Farajidana | H04B 7/0417 370/252 |
| 2011/0044250 | A1 | 2/2011 | Han et al. | |
| 2012/0106388 | A1 | 5/2012 | Shimezawa et al. | |
| 2013/0083774 | A1 | 4/2013 | Son et al. | |
| 2013/0286960 | A1* | 10/2013 | Li | H04W 72/042 370/329 |
| 2015/0016379 | A1 | 1/2015 | Nam et al. | |
| 2015/0023453 | A1* | 1/2015 | Ajima | H04B 7/0456 375/340 |
| 2016/0173176 | A1* | 6/2016 | Mizusawa | H04B 7/0456 375/267 |

FOREIGN PATENT DOCUMENTS

| | | |
|---|---|---|
| JP | 2011087141 A | 4/2011 |
| KR | 20130097117 A | 9/2013 |

OTHER PUBLICATIONS

Written Opinion of the International Searching Authority issued in corresponding application No. PCT/JP2014/073070 dated Dec. 9, 2014 (3 pages).

3GPP TS 36.300 V11.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Dec. 2012 (208 pages).

Extended European Search Report issued in the counterpart European Patent Application No. 14843031.7, dated May 11, 2017 (9 pages).

Office Action issued in corresponding Japanese Patent Application No. 2013-184655, dated Jul. 25, 2017 (6 pages).

\* cited by examiner

|  | USER REQUEST | CONNECTION INFORMATION | NUMBER OF BEAMS RECEIVED | RECEIVED QUALITY | TRANSMISSION METHOD |
|---|---|---|---|---|---|
| EXAMPLE 1 | 3 STREAMS | PRIORITY HIGH | 2 | MEDIUM | 2 STREAMS, FIXED WEIGHT |
| EXAMPLE 2 | 4 STREAMS | PRIORITY INTERMEDIATE | 3 | GOOD | 2 STREAMS, ADAPTIVE WEIGHT |
| EXAMPLE 3 | 2 STREAMS | PRIORITY LOW | 2 | POOR | 1 STREAM, FIXED WEIGHT |

FIG.5

RADIO BASE STATION, USER TERMINAL AND RADIO COMMUNICATION METHOD

TECHNICAL FIELD

The present invention relates to a radio base station, a user terminal and a radio communication method in a next-generation mobile communication system.

BACKGROUND ART

In a UMTS (Universal Mobile Telecommunications System) network, the specifications of long-term evolution (LTE) have been drafted for the purpose of further increasing high-speed data rates, providing lower delay and so on (see non-patent literature 1). Also, successor systems of LTE (referred to as, for example, "LTE-advanced," "FRA (Future Radio Access)" and so on (hereinafter referred to as "LTE-A")) have been under study for the purpose of achieving further broadbandization and increased speed beyond LTE.

In LTE-A and later mobile communication systems, application of the MIMO transmission scheme (massive MIMO (Multi Input Multi Output)), which uses a large number of antenna elements in a high frequency band (hereinafter also referred to as "massive-MIMO"), is under study.

The massive-MIMO transmission scheme achieves improved data rates (spectral efficiency) by transmitting data using a large number (for example, 100 or more) of antenna elements. Since data is transmitted by using a large number of antenna elements, compared to when a small number of antenna elements are used, it becomes possible to improve the efficiency of transmission by virtue of multiplexing, and enable faster radio communication than heretofore. Also, reliable beamforming is made possible by combining a large number of antenna elements.

Here, "beamforming (BF)" refers to the technique of allowing transmitting/receiving beams to have directivity, and changing the shape of beams by controlling the amplitude and phase of each transmitting/received signal in a plurality of antenna elements. In this beamforming, generally, a larger number of antenna elements allow more reliable control. In other words, it is possible to control, in detail, the number of beams, the shape of each beam (the beam width in the horizontal plane, the beam width in the vertical plane and so on) and the direction and gain of beams, depending on the number of antenna elements. For example, high gain (power density) can be achieved by narrowing the width of beams (that is, by forming thin beams).

CITATION LIST

Non-Patent Literature

Non-Patent Literature 1: 3GPP TS 36.300 "Evolved UTRA and Evolved UTRAN Overall Description"

SUMMARY OF INVENTION

Technical Problem

Generally speaking, the propagation loss (path loss) in a high frequency band becomes large compared to the propagation loss in a low frequency band, and therefore it becomes difficult to secure a wide coverage in a high frequency band. Consequently, when employing massive-MIMO in a high frequency band, it may be likely to expand the coverage by applying beamforming and transmit data.

When beamforming is employed, it is necessary to determine the weights (BF weights) to apply to (multiply over) transmitting signals. Beamforming weights can be determined based on channel states between radio base stations and user terminals. In conventional systems, channel estimation is performed by using reference signals to which beamforming is not applied, and beamforming weights are determined based on the result of this channel estimation (channel state information).

However, when the conventional method is employed in massive-MIMO, user terminals that are located far from radio base stations cannot receive reference signals adequately, and therefore have difficulty performing channel estimation adequately. That is, depending on the receiving conditions in user terminals, there is a threat that data signals to which beamforming is applied cannot be transmitted.

The prevent invention has been made in view of the above, and it is therefore an object of the present invention to provide a radio base station, a user terminal and a radio communication method, whereby data signals to which beamforming is applied can be transmitted adequately in a communication system where massive MIMO is employed.

Solution to Problem

The radio base station according to the prevent invention provides a radio base station that transmits a data signal to a user terminal by applying beamforming using a plurality of antenna elements, and that has a determining section that determines the type of a weight to apply to the data signal for beamforming, a generating section that generates a reference signal which the user terminal uses in channel estimation, a weight control section that controls weights to apply to transmitting signals, and a transmitting section that transmits the data signal and the reference signal, and, in this radio base station, the weight control section determines whether or not to apply a weight to the reference signal based on the type of the weight.

Advantageous Effects of Invention

According to the present invention, data signals to which beamforming is applied can be transmitted adequately in a communication system where massive MIMO is employed.

BRIEF DESCRIPTION OF DRAWINGS

FIG. 5 is a diagram to show examples of data transmission methods to be determined based on predetermined conditions;

DESCRIPTION OF EMBODIMENTS

Figure 1:
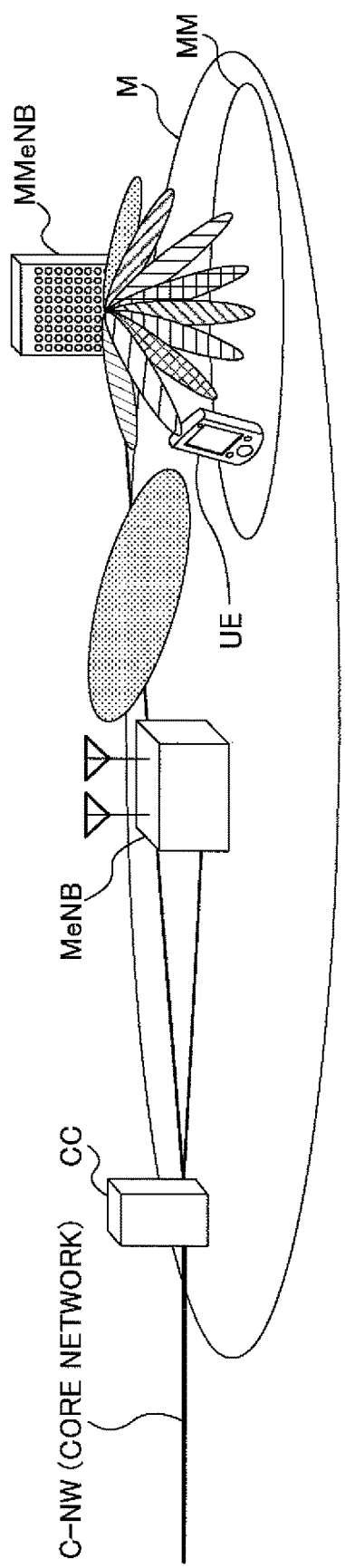
FIG. 1 is a diagram to show an example network structure where base station apparatuses according to the present embodiment are employed.

FIG. 1 is an example of a conceptual diagram to show a network structure in which the radio base station (massive-MIMO base station (MM base station)) according to the present embodiment is employed. FIG. 1 shows a network structure where the MM base station (MMeNB) according to the present embodiment forms a massive-MIMO cell MM (MM cell), which overlays on the cell area of a macro cell M. Note that the network structure to employ the massive-MIMO base station (MM base station) according to the present embodiment is by no means limited to the structure shown in FIG. 1.

In the network structure shown in FIG. 1, the radio base station (macro base station (MeNB)) to form the macro cell M and the radio base station (MM base station (MMeNB)) to form the massive-MIMO cell (MM cell) are connected with a central control station (CC). This central control station is connected to an unillustrated core network. The central control station may incorporate, for example, an access gateway apparatus, a radio network controller (RNC), a mobility management entity (MME) and so on. Note that a structure may be employed in which part or all of the functions of the central control station are provided in the macro base station.

A user terminal (UE) is structured to be capable of communicating with the macro base station when located in the macro cell M, and communicating with the MM base station, in addition to the macro base station, when located in the massive-MIMO cell MM. Note that the user terminal according to the present embodiment is either a mobile terminal apparatus or a stationary terminal apparatus.

In the structure shown in FIG. 1, for example, the control plane (C (Control)-plane) to handle control messages is supported by the macro cell M. On the other hand, the user plane (U (User)-plane) to handle user data is supported by the massive-MIMO cell MM. Also, in the structure shown in FIG. 1, the macro cell M and the massive-MIMO cell MM can operate in different frequency bands. For example, it is possible to operate the C-plane supported by the macro cell M in a low frequency band (for example, 2 GHz band), and operate the U-plane supported by the massive-MIMO cell MM in a high frequency band (for example, 10 GHz band).

Note that, although FIG. 1 shows a case where the MM cell is placed to overlap the macro cell, the present embodiment is by no means limited to this. It is also possible to employ a structure in which the MM cell overlaps a wireless LAN (Local Area Network) or a cable LAN covering a wide range. Also, it is equally possible to place the MM cell not to overlap other radio base stations or networks.

The MM base station can transmit signals to user terminals located in the MM cell by using the massive-MIMO transmission scheme. To be more specific, by controlling the amplitude and phase of each transmitting signal using a plurality of antenna elements, the MM base station can form transmission beams with a directivity to each user terminal (beamforming) and transmit signals.

Note that, as shown in FIG. 1, when a user terminal can connect with both the macro base station and the MM base station, the C-plane and the U-plane can be controlled separately. For example, it is possible to transmit control information that is necessary to receive user data (data signals) from the macro base station to the user terminal, while transmitting user data from the MM base station. Also, while the macro base station transmits part of the control information, the MM base station can transmit the rest of the control information and user data.

Now, in relationship to the massive-MIMO transmission scheme, a study is in progress to use high frequency bands of, for example, 10 GHz or above. The propagation loss (path loss) in a high frequency band becomes large compared to the propagation loss in a low frequency band, and therefore it becomes difficult to secure a wide coverage in a high frequency band compared to a low frequency band. Consequently, when massive-MIMO is applied to a high frequency band, as noted earlier, it is preferable to expand the coverage by applying beamforming and transmit data.

Figure 2:
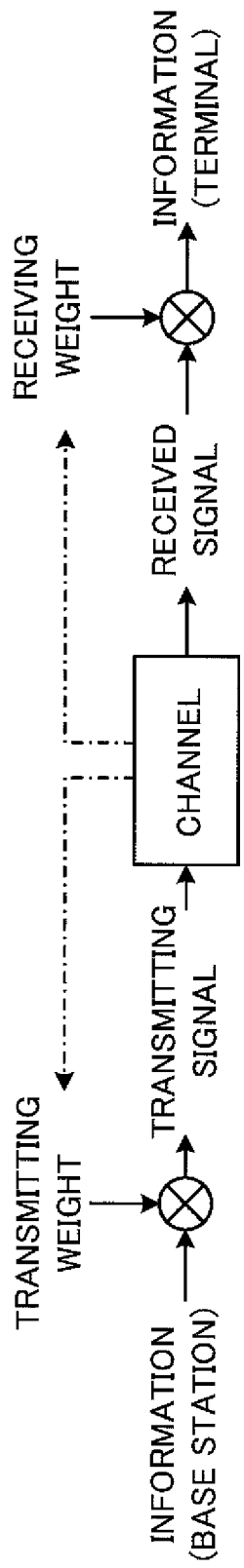
FIG. 2 is a diagram to show multiplication of BF weights on the downlink.

As noted earlier, when beamforming is employed, channel state information is necessary to determine the beamforming weights (BF weights) to apply to transmitting signals. For example, when a data signal is transmitted from a radio base station to a user terminal by way of beamforming (in the event of downlink transmission), the radio base station multiplies the transmitting signal by a transmitting weight that matches the channel state, and the user terminal multiplies the received signal by a receiving weight (see FIG. 2). Note that FIG. 2 shows an example of the downlink, and, in the event of the uplink, the user terminal multiplies a transmitting signal by a transmitting weight and the radio base station multiplies the received signal by a receiving weight.

That is, when data signals are transmitted by applying beamforming, it is necessary to learn information about the channel states between radio base stations and user terminals, and determine beamforming weights. In existing systems, channel estimation is performed by using reference signals (for example, channel state measurement reference signals (CSI-RSs)) to which beamforming (weights) is not applied, and weights are determined based on the result of estimation (channel state information (CSI)).

Figure 3:
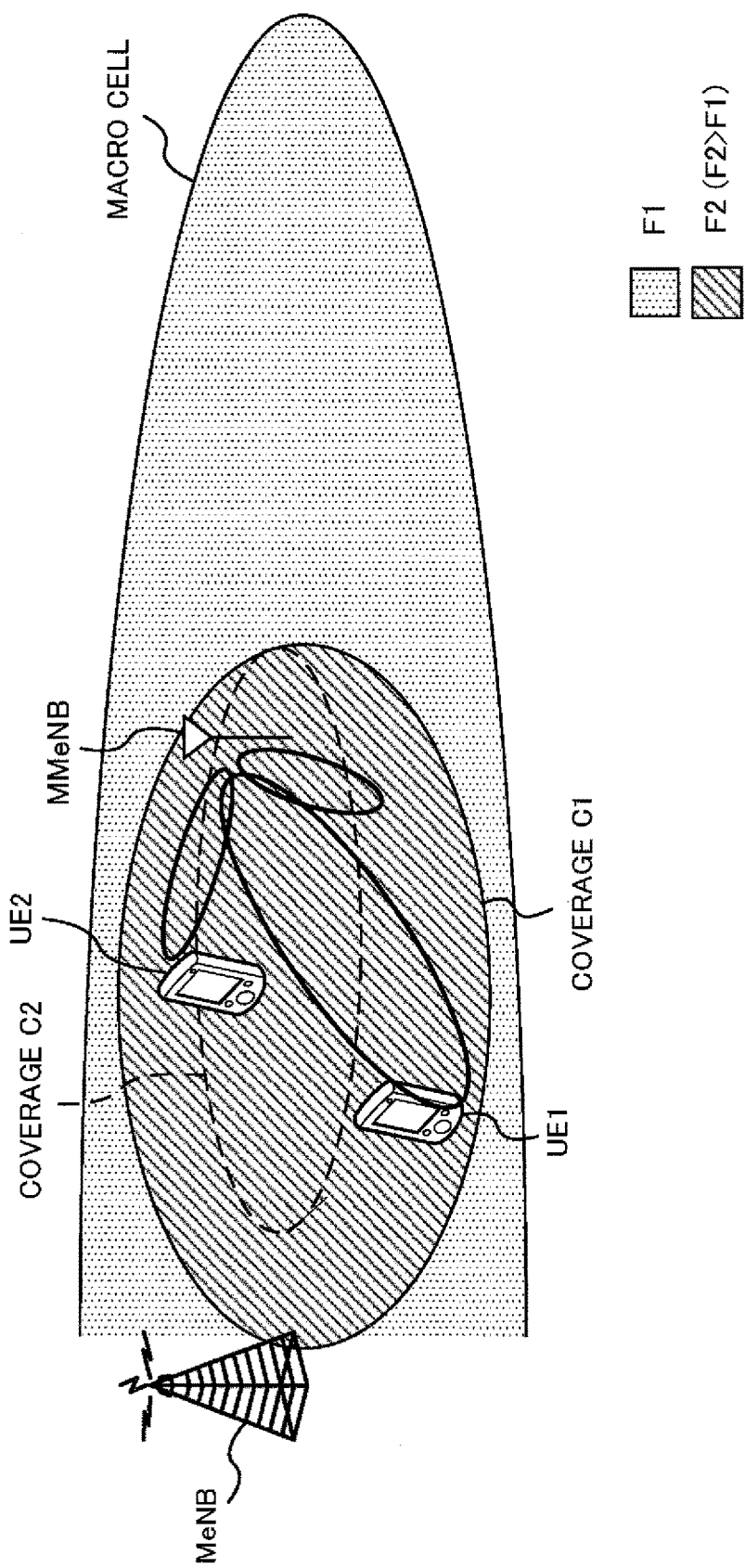
FIG. 3 is a diagram to show a conceptual diagram of transmitting signal coverages, which depend on whether or not beamforming is used.

On the other hand, when a high frequency band is applied to the MM cell, there is a threat that signals that are applied beamforming and transmitted from the MM base station and signals that are transmitted without being applied beamforming exhibit significantly different coverages. FIG. 3 shows a conceptual diagram of the coverages of signals transmitted from the MM base station, which depend on whether or not beamforming is applied.

As shown in FIG. 3, the coverage (coverage C1) of data signals to which beamforming is applied expands in predetermined directions compared to the coverage (coverage C2) of reference signals to which beamforming is not applied. Consequently, when channel estimation is estimated by using the existing method, a user terminal UE 2 that is located within the range of the coverage C2 can estimate channel states adequately based on the reference signals to which beamforming is not applied, so that it is possible to determine beamforming weights adequately.

Meanwhile, a user terminal UE 1 that is located outside the range of the coverage C2 and located within the range of the coverage C1 cannot perform channel estimation by using the reference signals to which beamforming is not applied. As a result of this, the MM base station cannot determine the weight to apply to the data signal to transmit to the user terminal UE 1 (and the channel estimation reference signals), and has difficulty employing beamforming.

In this way, depending on the situation user terminals are in (the received quality, the distance from the MM base station, and so on), there is a threat that data signals to which beamforming is applied cannot be transmitted. For example, for a user terminal with good received quality (the user terminal UE 2 in FIG. 3), the MM base station can determine weights and apply beamforming based on reference signals to which beamforming is not applied. On the other hand, for user terminals with poor received quality (the user terminal UE 1 in FIG. 3), the MM base station cannot determine weights based on reference signals to which beamforming is not applied.

So, the present inventors have come up with the idea of making it possible to apply beamforming adequately, even to user terminals that cannot receive reference signals to which beamforming is not applied, by taking into account the receiving conditions of user terminals, and applying fixed weights to channel estimation reference signals and data signals and executing beamforming with respect to specific user terminals.

To be more specific, the data signal transmission method for a user terminal (the type of weights to apply, the number of streams, etc.) is determined based on the receiving conditions of the user terminal (for example, the received quality, the number of beams received, and so on). Then, based on this transmission method, the types of channel estimation reference signals to transmit to the user terminal and the transmission method thereof (including whether or not to apply weights, the number of streams, etc.) are controlled. By this means, it becomes possible to configure adequate weights for each user terminal and apply beamforming.

Now, the present embodiment will be described below in detail with reference to the accompanying drawings. Note that the following description will presume a state in which a user terminal is already connected with the MM base station, because the user terminal performed cell search in the MM cell in the step of determining the data transmission method for the user terminal in the MM base station.

First, the operation for connecting between the MM base station and the user terminal will be described briefly. Note that the connection operation that is applicable to the present embodiment is by no means limited to the method described below.

The MM base station can use a plurality of transmission beams, to which varying fixed weights are applied, as synchronization signals (SS signals) to apply to cell search. That is, the MM base station applies beamforming to the synchronization signals, and generates and transmits a plurality of transmission beams of narrow beam widths. In this case, the MM base station includes identification information (for example, beam ID) in each of the synchronization signals to which varying weights are applied, and transmits these signals.

The user terminal feeds back the identifiers (beam IDs) and the received quality (RSRP, RSRQ and so on) of synchronization signals that are detected, among a plurality of synchronization signals that are applied beamforming and transmitted from the MM base station.

By this means, even when a user terminal is present in a location somewhat distant from the MM base station, it still becomes possible to detect synchronization signals in the user terminal and perform the cell search process adequately. Also, based on information that is fed back from user terminals, the MM base station can determine predetermined fixed weights to apply to each user terminal from among a plurality of fixed weights.

Figure 4A:
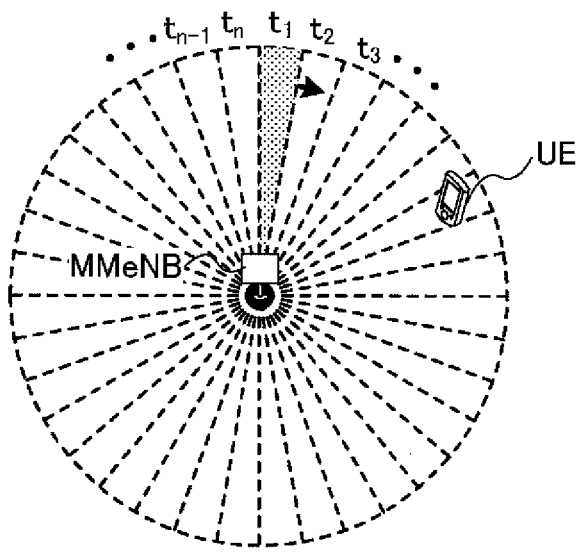
FIG. 4 provides diagrams to show an example case where synchronization signals (SSs) are transmitted by applying beamforming.
Figure 4B:
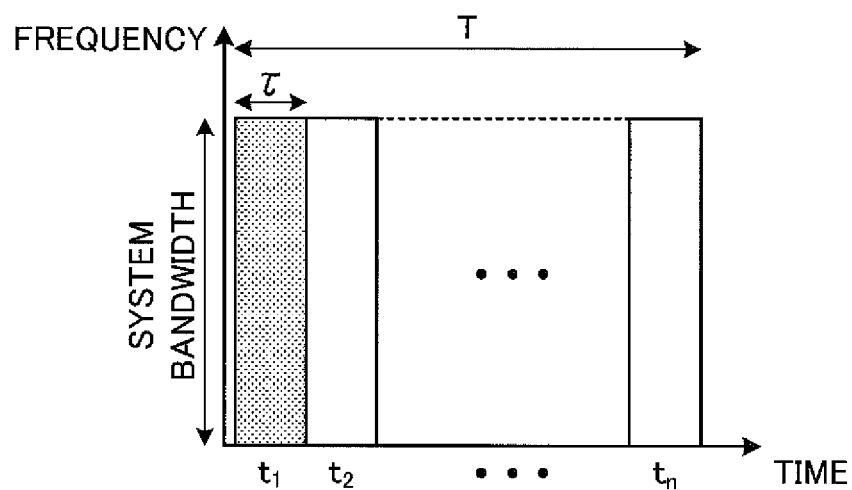

FIG. 4 shows an example transmission method of synchronization signals to which beamforming is applied. FIG. 4A shows a schematic image of transmission of synchronization signals that are transmitted from the MM base station. FIG. 4B shows synchronization signals that are transmitted from the MM base station on the time axis and the frequency axis. As shown in FIG. 4A, the MM base station switches the transmission beam of a narrow beam width, between azimuthal directions, per time interval τ, thereby transmitting the synchronization signals, to which beamforming is applied, over the whole massive-MIMO cell in a predetermined total time of T.

For example, the MM base station transmits a narrow beam in a certain direction in the MM cell at a timing $t_1$, and, after that, transmits the narrow beam by shifting the direction of transmission to a azimuthal direction, through the beam width Φ, at a timing $t_2$. BF-SS signals, which are transmitted per time interval τ, can be transmitted by using the whole system bandwidth of the communication system (see FIG. 4B). The synchronization signals, to which varying weights are applied, contain identification information (beam IDs), so that the user terminal can specify a synchronization signal received.

Note that, although FIG. 4 show a case where the synchronization signals are scanned two-dimensionally (2D), it is equally possible to scan these signals three-dimensionally (3D). For example, by adding elevation directions to the directions to transmit the narrow beam for transmitting the synchronization signals, and switching between the azimuthal directions and the elevation directions every time interval τ, it becomes possible to scan all the user terminals located in the area of the massive-MIMO cell. Note that an "elevation direction" herein is orthogonal to a horizontal direction, and is defined as a direction represented by angle where the angle to show the direction to go downward (or upward) is 0° and the angle to represent the horizontal direction is 90°.

Also, the user terminal feeds back information about the identification information (beam IDs) of the synchronization signals detected upon cell search, to the MM base station. By this means, the MM base station can learn weight information corresponding to a specific synchronization signal. The MM base station can use this weight information in radio communication with the user terminal having established connection. The following description will presume a state in which the user terminal has performed cell search in the MM cell and is already connected with the MM base station.

<Determining Data Signal Transmission Method>

First, the MM base station determines the data transmission method for the user terminal. To be more specific, the MM base station determines the type of weights to apply to data signals and/or the number of streams to transmit, as the data transmission method. As the types of weights, there are fixed weights to define predetermined weights in advance, and adaptive weights to generate weights as appropriate based on channel state information that is fed back from the user terminal.

The MM base station decides the transmission method (the type of weights, the number of streams to transmit, and so on) by considering information such as control information from higher nodes (for example, the macro base station), signals requested from the terminal, the cell search result (the number of beams received in the user terminal, the beam IDs, each beam's received quality, etc.) and so on, in a comprehensive manner. FIG. 5 shows examples of deciding the type of weights and the number of streams to transmit.

FIG. 5 shows a case of determining the transmission method based on the number of streams requested for transmission from the user terminal, the priority of data signal transmission with respect to the user terminal, the number of beams received in the user terminal upon cell search, and the received quality of these received beams. Note that the examples shown in FIG. 5 are only example, and the present embodiment is by no means limited to these.

Although the number of streams requested from the user terminal is 3 in example 1 of FIG. 5, the number of streams is nevertheless made 2, considering that the number of synchronization signal beams received upon cell search is 2 and that the priority is high. Also, considering that the received quality is an intermediate level, fixed weights are selected.

In example 2 of FIG. 5, the number of streams is made 2, considering that the number of streams requested from the user terminal is 4, the number of synchronization signal beams received upon cell search is 3 and the priority is normal. Furthermore, considering that the received quality is high, adaptive weights are selected.

In example 3 of FIG. 5, although the number of streams requested from the user terminal is 2 and the number of synchronization signal beams received upon cell search is 2, the number of streams is nevertheless made 1 and fixed weights are selected, considering that the priority is low and the received quality is low.

Note that, although it is preferable to determine the data signal transmission method in the MM base station, the data signal transmission method may be determined in a higher node (for example, the macro base station) as well. Note that, when the transmission method is determined outside the MM base station, the determined transmission method is at least reported to the MM base station. For example, when the transmission method is determined in the macro base station, the determined transmission method is reported to the MM base station via a backhaul link (X2 interface, optical fiber and so on).

Alternatively, when the data signal transmission method is determined in the MM base station or the macro base station, information about this transmission method may be reported to the user terminal. By allowing the user terminal side to learn the data signal transmission method, it is possible to reduce the load of the receiving operations.

Note that, although a case is shown here where data signals are space-multiplexed and transmitted, according to the present embodiment, data signals can be transmitted by combining other multiplexing schemes (for example, frequency multiplexing, time multiplexing, etc.) besides space multiplexing as well.

<Determining Channel Estimation Signal Transmission Method>

The MM base station, after determining the data signal transmission method, determines the type of channel estimation reference signals (the signal configuration and so on), the transmission method thereof (whether or not to apply beamforming (weights) and/or the number of streams to transmit) and so on, based on this data signal transmission method. The reference signals for channel estimation have only to be reference signals that allow the user terminal to perform channel estimation.

To be more specific, the MM base station determines whether or not to apply weights to the reference signals depending on the type of weights to select (fixed weights or adaptive weight). For the reference signals, downlink reference signals in existing systems (CSI-RS, DM-RS, CRS and so on) may be re-used, or new reference signals may be defined.

Now, channel estimation reference signal transmission methods, corresponding to the data signal transmission methods, will be described in detail below. Note that, although a case will be shown in the following description where both the type of weights and the number of streams are taken into account, this is by no means limiting. For example, whether or not to apply beamforming to the channel estimation reference signals can be determined considering the type of weights alone.

(1) Applying Fixed Weight/1-Stream Transmission

For example, when there is little traffic for the user terminal or when the priority of data signal transmission is low, the MM base station applies a fixed weight to the data signal and carries out 1-stream transmission. In this case, for example, the MM base station can apply the same fixed weight as the fixed weight of a synchronization signal (predetermined beam ID) that was received in the user terminal upon cell search, as noted earlier, to the channel estimation reference signal and transmit this signal.

Also, the MM base station applies the fixed weight applied to the channel estimation reference signal to the data signal as well, and transmits the data signal. When a fixed weight is selected as the data signal transmission method, it is possible to use, for example, the DM-RS of existing systems as the channel estimation signal.

By applying a fixed weight, even when the user terminal is located far from the MM base station (for example, like UE 1 in above FIG. 3), it is still possible to apply beamforming and transmit the data signal adequately. Also, the MM base station can execute beamforming based on channel estimation of high reliability, by determining the fixed weight to apply by using a fixed weight (beam ID) that was acquired upon cell search, as mentioned earlier.

Note that the fixed weight which the MM base station uses is by no means limited to the configuration of using a fixed weight that was acquired upon cell search as mentioned earlier, and may be determined based on information about a fixed weight acquired in other methods.

(2) Applying Adaptive Weight/1-Stream Transmission

For example, when there is little traffic for the user terminal, or when the priority of data signal transmission is low and yet the receiving conditions are good, the MM base station applies an adaptive weight to the data signal and carries out 1-stream transmission. In this case, the MM base station transmits the channel estimation reference signal without applying beamforming. The user terminal measures the channel state based on this reference signal.

Then, the MM base station acquires channel state information that is fed back from the user terminal, generates a transmitting weight based on this channel state information and applies the generated weight to the data signal. When an adaptive weight is selected as the data signal transmission method, for example, the CRS, the CSI-RS and so on of existing systems can be used as a reference signal to which beamforming is not applied.

By applying an adaptive weight, when the user terminal is located near the MM base station (for example, like UE 2 in above FIG. 3), it is possible to generate optimal weights depending on channel states, so that it is possible to improve the quality of data signal communication.

(3) Applying Fixed Weights/Multiple-Stream Transmission

For example, when the traffic for the user terminal is heavy, or when the priority of data signal transmission is high, the MM base station applies fixed weights to data signals and carries out multiplex transmission in multiple streams. In this case, the MM base station generates channel estimation reference signals by using the same number of orthogonal sequences as the number of streams to transmit, and, furthermore, applies separate fixed weights to each reference signal.

For the fixed weights, the same fixed weights as the above-noted fixed weights of the synchronization signals (beam IDs) received in the user terminal upon cell search can be applied. Also, the MM base station applies a plurality of fixed weights to the data signals transmitted in each stream, separately, and carries out multiplex transmission.

By this means, even when user terminals are located far from the MM base station (for example, like UE 1 in above FIG. 3), it is possible to apply beamforming and transmit many data signals in multiple streams. Note that the orthogonal sequences to apply to a plurality of reference signals can be made sequences to frequency-multiplex and/or time-multiplex.

Note that the fixed weights which the MM base station uses are by no means limited to the configuration of using the above-noted fixed weights that were acquired upon cell search, and may be determined based on information about fixed weights acquired in other methods.

(4) Applying Adaptive Weights/Multiple-Stream Transmission

For example, when the receiving conditions in the user terminals are good, the traffic is heavy or the priority of data signal transmission is high, the MM base station applies adaptive weights to data signals and carries out multiple-stream transmission. In this case, the MM base station transmits a plurality of channel estimation reference signals that are made orthogonal to each other with orthogonal sequences, without applying beamforming. The user terminal measures the channel state of each stream based on each reference signal.

Then, the MM base station acquires the channel state information of each stream that is fed back from the user terminal, and generates transmitting weights, corresponding to each stream, based on the channel state information. The transmitting weights that are generated are applied to the data signals transmitted in each stream.

By this means, when user terminals are located near the MM base station (for example, like UE 2 in above FIG. 3), it is possible to generate optimal weights depending on channel states, and, furthermore, apply beamforming and transmit many data signals in multiple streams.

Note that, when a plurality of user terminals are present, the transmission method for each user terminal may be determined depending on the state of each user terminal. Also, in this case, it is possible to multiplex reference signals that are suitable for the user terminals' respective transmission methods, in the time direction, and transmit these signals.

<User Terminal Operation>

When fixed weights are applied to data signals, the user terminal estimates channel states based on channel estimation reference signals that are transmitted from the MM base station, and generates receiving weights. In this case, the channel estimation reference signals function as demodulation reference signals for demodulating the data signals as well. Also, when the user terminal acquires information about the data signal transmission method (the type of weights applied and/or the number of streams), it becomes possible to reduce the load of the receiving operations (channel estimation process and so on) based on this information about the transmission method.

Also, when adaptive weights are applied to data signals, the user terminal estimates channel states by using channel estimation reference signals that are transmitted from the MM base station, and calculates the transmitting/receiving weights for use in the user terminal. Furthermore, the user terminal sends the channel states to the MM base station using some method. In this case, the user terminal may feed back the estimated results to the MM base station, via a higher node (for example, the macro base station), as channel states. Alternatively, the user terminal may transmit reference signals, to which transmitting weights calculated in the user terminal are applied, to the MM base station, and the MM base station may estimate channel states by receiving these reference signals. Note that which method will be used may be determined as appropriate depending on the system and so on.

Note that although a case to apply TDD has been presumed in the above description, it is equally possible to apply the present embodiment to FDD. In FDD, different frequency bands are employed between the downlink and the uplink, so that it is necessary to estimate uplink channel states apart from the downlink. Consequently, regarding the uplink, user terminals may transmit channel estimation reference signals (for example, SRSs), and the MM base station may estimate uplink channel states by using the reference signals transmitted from the terminals. In this case, the user terminals may use transmitting weights with the reference signals, or may not use transmitting weights. The MM base station can generate receiving weights base on the uplink channel states.

<Operation Method>

Figure 6:
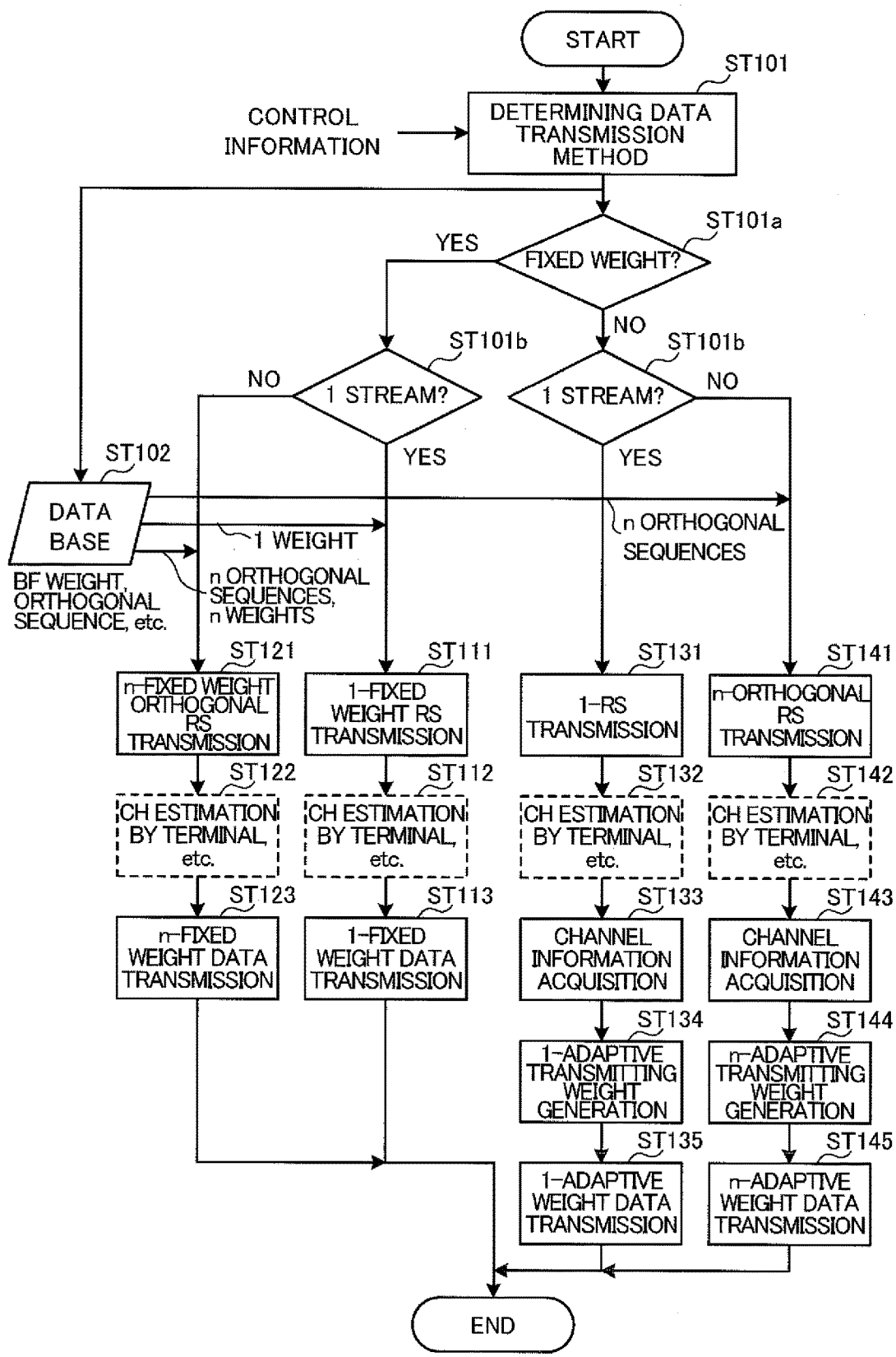
FIG. 6 is a diagram to explain an example operation sequence for transmitting data signals from a massive-MIMO base station according to the present embodiment.

Next, the operations of the MM base station and the user terminal will be described. FIG. 6 is a flowchart to explain the operation of transmitting data signals from the MM base station according to the present embodiment, by applying beamforming. Note that FIG. 6 presumes that the user terminal has performed cell search in the MM cell and is already connected with the MM base station.

As shown in FIG. 6, first, the MM base station determines the data signal transmission method (ST101). To be more specific, based on control information and so on transmitted from a higher node (for example, the macro base station), the MM base station determines the type of weights (fixed weights or adaptive weights) to apply to beamforming (ST101*a*), and, furthermore, determines the number of streams to transmit (ST101*b*). The MM base station makes decisions, in a comprehensive manner, based on information such as control information from the higher node (for example, the macro base station), signals requested from the terminal, the cell search result (the number of beams received in the user terminal, each beam's received quality, etc.) and so on.

When carrying out 1-stream transmission by applying a fixed weight, the MM base station multiplies a channel estimation reference signal by a predetermined fixed weight and carries out transmission by applying beamforming (ST111). Note that the fixed weight to apply can be determined based on information that is output from a data base (memory section) (ST102). For the predetermined fixed weight to be selected by the MM base station, as noted earlier, a fixed weight to correspond to a predetermined synchronization signal (beam ID) which the user terminal acquired upon cell search can be applied.

The user terminal generates a receiving weight by performing channel estimation based on the reference signal transmitted from the MM base station (ST112). Also, the MM base station multiplies the data signal by the same fixed weight as the fixed weight applied to the reference signal, and carries out transmission by applying beamforming (ST113). Note that the channel estimation reference signal and the data signal can be allocated with the same timing (for example, in the same subframe) and transmitted.

When transmitting multiple streams (for example, n streams (n>1)) by applying fixed weights, n channel estimation reference signals are multiplied by mutually independent fixed weights, and, furthermore, applied different orthogonal sequences (ST121). By this means, it is possible to transmit n mutually orthogonal reference signals from the MM base station by way of beamforming.

Also, the n fixed weights and n orthogonal sequences to apply to the reference signals corresponding to each stream respectively can be determined from information that is output from the data base (ST102). The n fixed weights, as noted earlier, can be selected from fixed weights that correspond to predetermined synchronization signals (beam IDs) which the user terminal acquired upon cell search.

The user terminal performs channel estimation for each stream based on the n channel estimation reference signals transmitted from the MM base station, and generates receiving weights (ST122). Also, the MM base station multiplies the data signals transmitted in each stream by the same weights as the weights applied to the reference signals of each stream, and carries out transmission by applying beamforming (ST123). Note that the channel estimation reference signals and data signals can be allocated with the same timing (for example, in the same subframes).

When one-stream transmission is carried out by applying an adaptive weight, the MM base station transmits a channel estimation reference signal without executing beamforming (weight multiplication) (ST131). The user terminal, after performing channel estimation based on the channel estimation reference signal transmitted from the MM base station, transmits information about the channel state to the MM base station (ST132). The MM base station receives the channel state information, which is acquired from the user terminal (ST133), and generates a weight based on this channel state information (ST134). Then, the MM base station multiplies the data signal by the generated weight, and transmits the data signal by applying beamforming (ST135). Note that, as noted earlier, to send the channel state information from the user terminal to the MM base station in ST132, it is possible to use the method of feeding back the estimation result to the MM base station as the channel state via a higher node (for example, the macro base station), or use the method of allowing the MM base station, having received the reference signal to which the transmitting weight calculated in the user terminal is applied, to estimate the channel state by using this reference signal. Note that, when FDD is used, it is preferable to use the former method.

When carrying out multiple-stream transmission (for example, n streams (n>1)) by applying adaptive weights, the MM base station transmits n channel estimation reference signals without executing beamforming (weight multiplication) (ST141). The n reference signals are made orthogonal to each other by using n orthogonal sequences that are output from the data base, and transmitted (ST102).

The user terminal, after performing channel estimation based on the n channel estimation reference signals transmitted from the MM base station, sends the channel state information of each stream to the MM base station (ST142). The MM base station receives the channel state information, which is acquired from the user terminal (ST143), and generates n adaptive weights based on the channel state information (ST144). Then, the MM base station multiplies the data signals to transmit in each stream by the n adaptive weights generated, and transmits the data signals by applying beamforming (ST145). Note that, in ST142, the channel state information may be transmitted from the user terminal to the MM base station by using the methods mentioned earlier in relationship to ST132.

Figure 7:
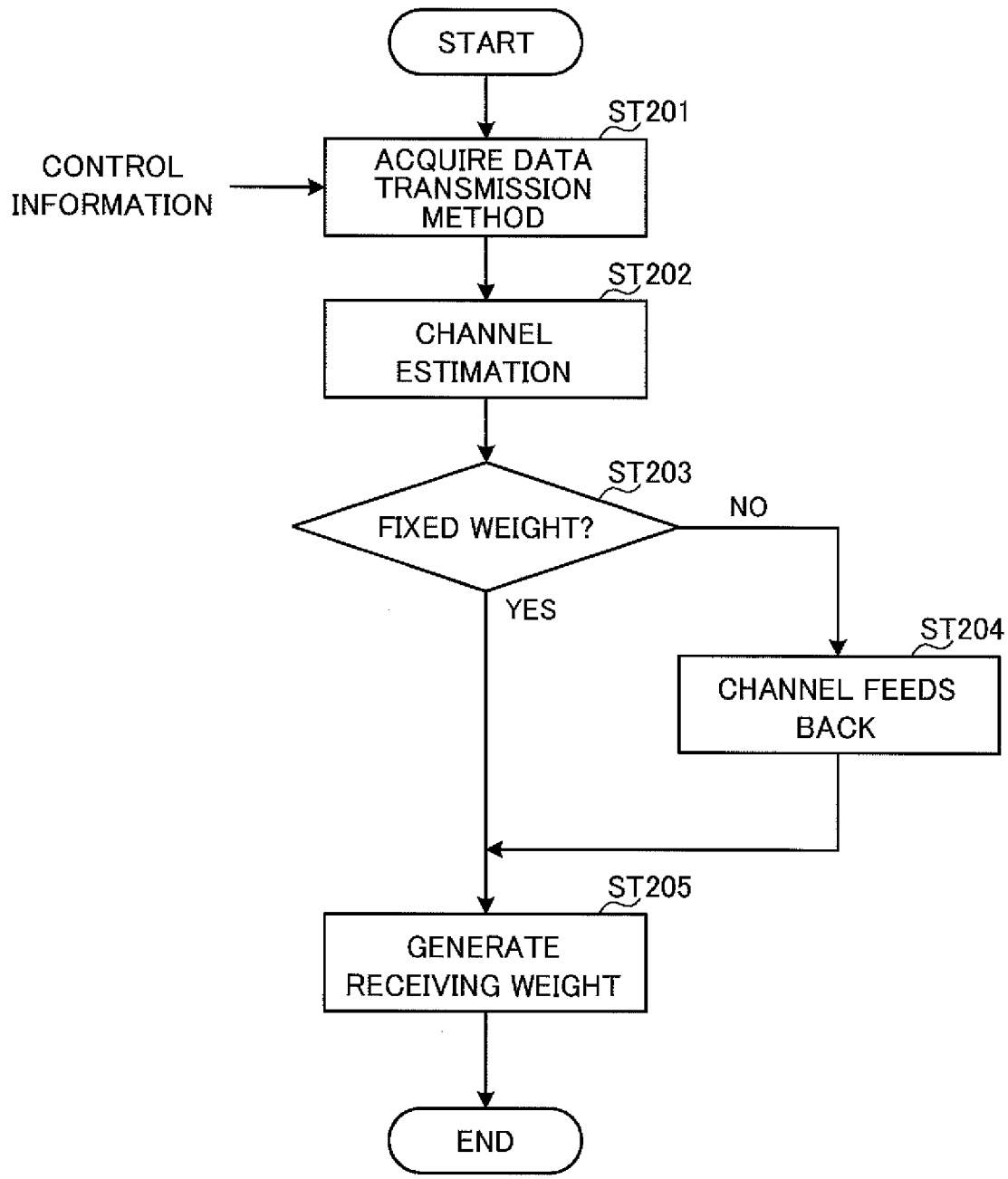
FIG. 7 is a diagram to explain an example operation sequence for generating receiving weights in a user terminal according to the present embodiment.

FIG. 7 is a flowchart to explain an example of the operation of generating a receiving weight in the user terminal according to the present embodiment, based on a reference signal transmitted from the MM base station. First, the user terminal acquires information about the transmission method for the data signal to be transmitted from the MM base station (the type of weights applied, the number of streams transmitted, etc.) (ST201). The information about the data signal transmission method may be configured to be received from the MM base station, or may be configured to be received from a higher node (for example, the macro base station). Note that, if the information about the transmission method is not reported to the user terminal, ST201 may be skipped.

The user terminal performs channel estimation based on a channel estimation reference signals reported from the MM base station (ST202). When the user terminal acquires information about the type of weights applied and the number of streams transmitted, it is possible to reduce the load of the channel estimation operation.

To be more specific, the user terminal decides whether or not beamforming is applied to (a fixed weight is multiplied on) the channel estimation signal (ST203), and, if a fixed weight is multiplied, generates a receiving weight by using this channel estimation reference signal (ST205).

On the other hand, when beamforming is not applied to the channel estimation reference signal, the user terminal sends the result of performing channel estimation (channel state information) to the MM base station (or a higher node) by using the reference signal to which beamforming is not applied (ST204). In this case, the user terminal can generate a receiving weight based on the channel state that is sent (ST205).

Figure 8:
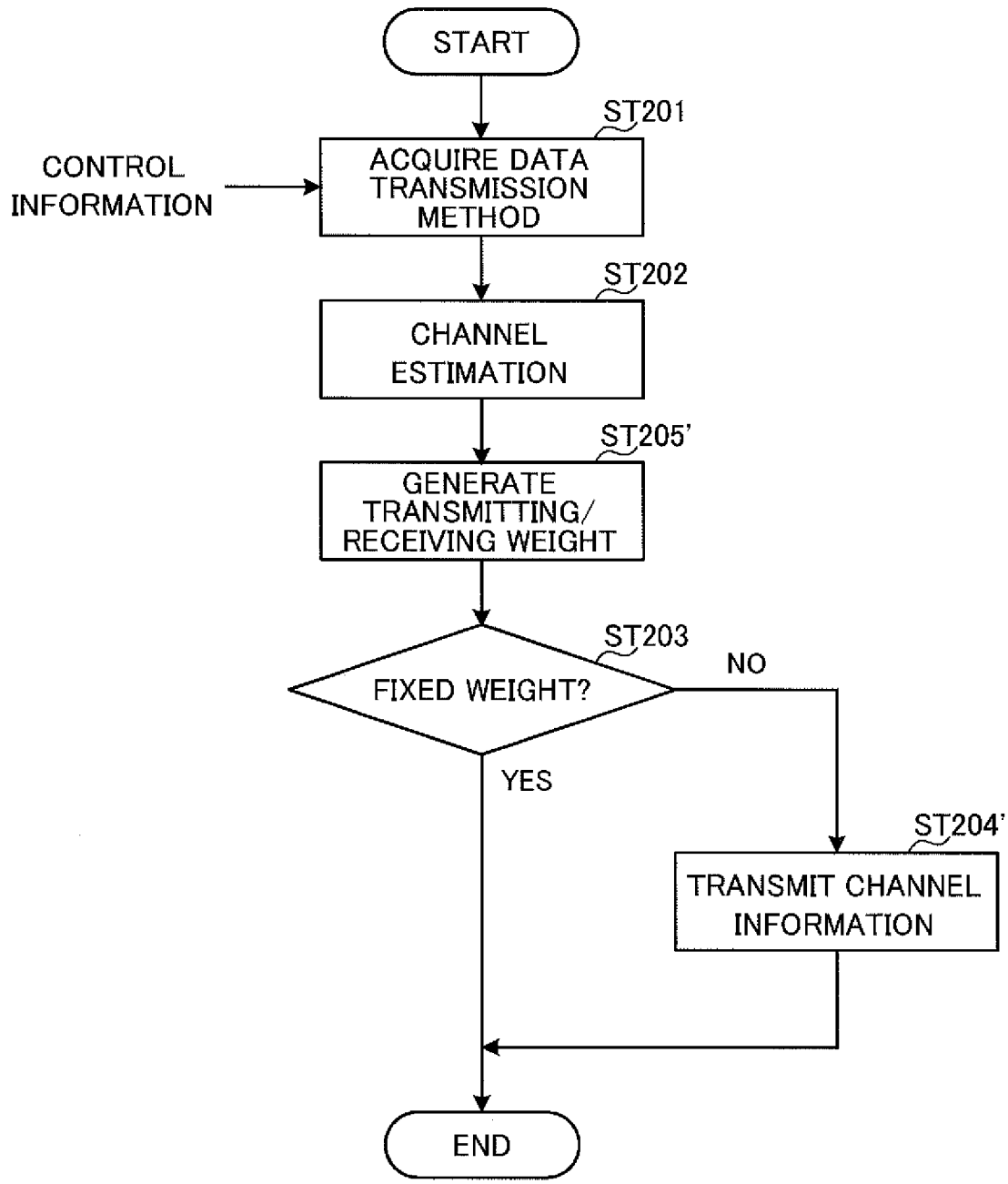
FIG. 8 is a diagram to explain another example operation sequence for generating receiving weights in a user terminal according to the present embodiment.

Note that, when the user terminal transmits a reference signal, to which a transmitting weight that is calculated in the user terminal is applied, to the MM base station, and the MM base station estimates the channel state by receiving this reference signal, it is preferable to provide a step (ST205') of generating a transmitting/receiving weight, prior to ST203 in FIG. 7 (see FIG. 8). Note that, when TDD is used, the operation method of FIG. 8 can be used.

<Structures of MM Base Station and User Terminal>

Figure 9:
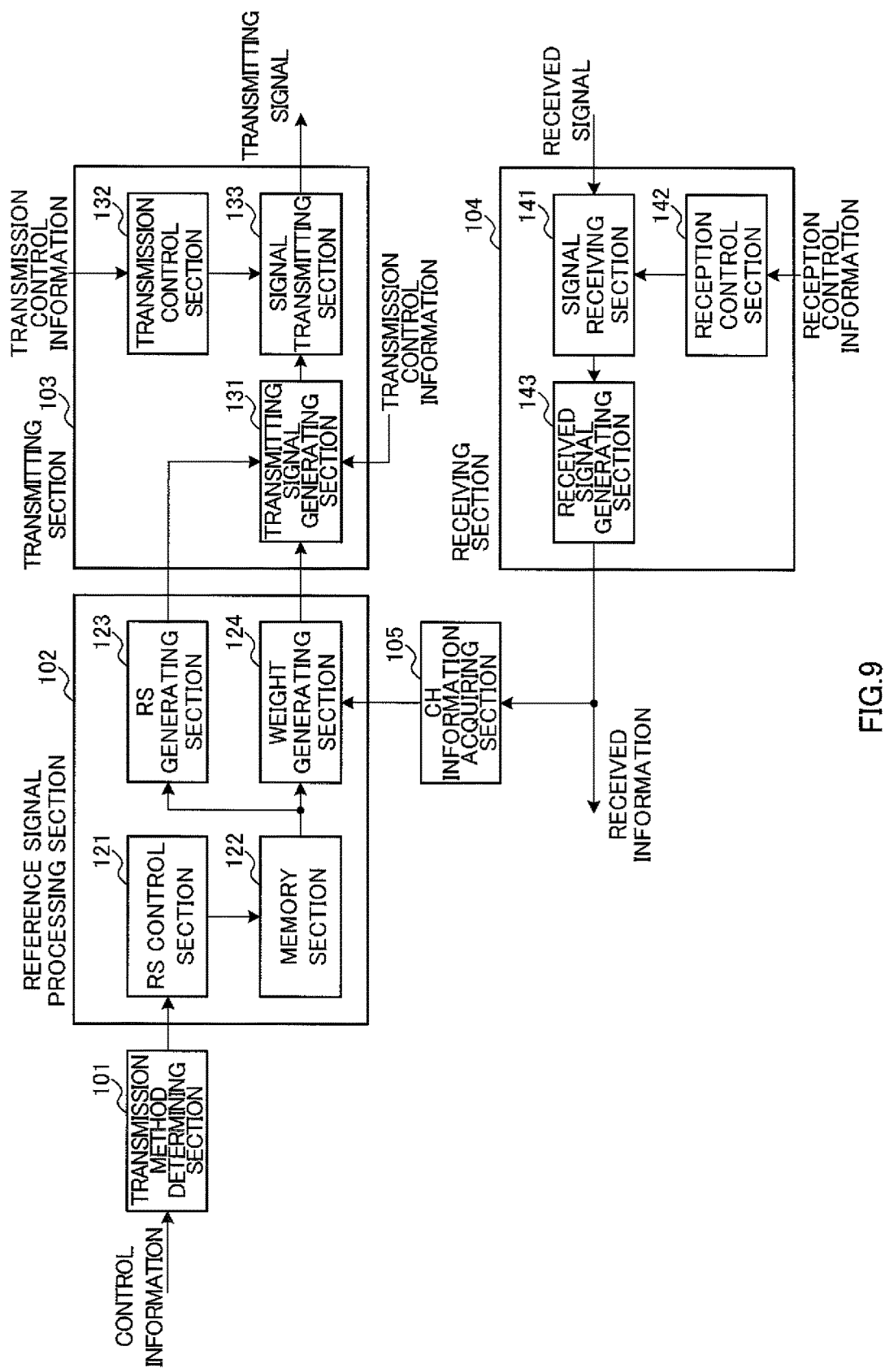
FIG. 9 is a block diagram to explain an example structure of a massive-MIMO base station according to the present embodiment.
Figure 10:
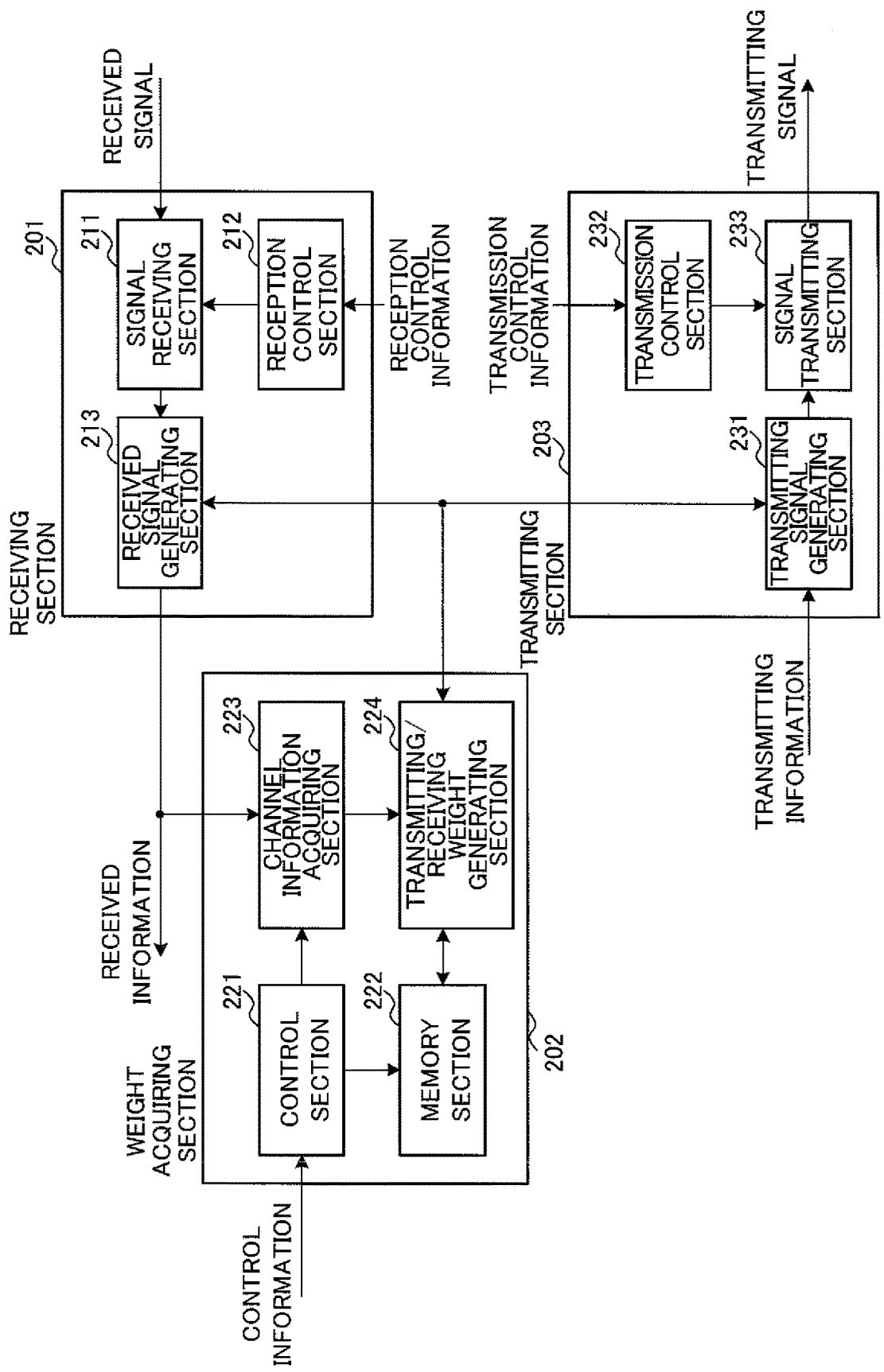
FIG. 10 is a block diagram to explain an example structure of a user terminal according to the present embodiment.

Next, example structures of the MM base station and the user terminal according to the present embodiment will be described. FIG. 9 is a block diagram to show an example of the structure of the MM base station. FIG. 10 is a block diagram to show an example of the structure of the user terminal.

Note that, although the structures of the MM base station and the user terminal shown in FIG. 9 and FIG. 10 are simplified in order to explain the characteristic parts of the present embodiment, structures that normal radio base stations and user terminals have are provided.

As shown in FIG. 9, the MM base station has a transmission method determining section 101, a reference signal processing section 102, a transmitting section 103, a receiving section 104 and a channel (CH) information acquiring section 105.

The reference signal processing section 102 is a block to perform processes pertaining to reference signals, and, to be more specific, includes a reference signal (RS) control section 121, a memory section 122, a reference signal (RS) generating section 123 and a weight generating section 124 (weight control section). The transmitting section 103 is a block to perform transmission processes, and, to be more specific, includes a transmitting signal generating section 131, a transmission control section 132 and a signal transmitting section 133. The receiving section 104 is a block to perform transmission processes, and, to be more specific, includes a signal receiving section 141, a reception control section 142 and a received signal generating section 143.

The transmission method determining section 101 determines the data signal transmission method based on predetermined information. For example, the transmission method determining section 101 decides the transmission method (the type of weights, the number of streams to transmit, and so on) by considering information such as control information from higher nodes (for example, the macro base station), signals requested from the terminal, the cell search result (the number of beams received in the user terminal, each beam's received quality, etc.) and so on, in a comprehensive manner.

The reference signal control section 121 determines the information (the type of weights and/or the number of streams) to output to the reference signal generating section 123 and the weight generating section 124, based on the transmission method determined in the transmission method determining section 101, and commands the memory section 122 to output predetermined information. For example, when applying a fixed weight, the reference signal control section 121 commands the memory section 122 to output information about the fixed weight to the weight generating section 124. Also, when carrying out transmission in multiple streams, the reference signal control section 121 commands the memory section 122 to output information about the orthogonal sequences to apply to reference signals to the reference signal generating section 123.

The memory section 122 holds information about predetermined fixed weights to apply to the reference signal and the data signal to transmit to the user terminal, the orthogonal sequences to apply when a plurality of streams are transmitted and so on. For example, the memory section 122 holds fixed weight information corresponding to a predetermined synchronization signal (beam ID) which the user terminal acquired upon cell search.

The reference signal generating section 123 generates the reference signal which the user terminal uses in channel estimation. When transmission is carried out using a plurality of streams, the reference signal generating section 123 generates reference signals to match the number of streams.

The weight generating section 124 (weight control section) controls the weights to apply to the transmitting signals. To be more specific, the weight generating section 124 determines whether or not to apply a weight to the reference signal depending on the data signal transmission method (the weight type). For example, when the transmission method determining section 101 selects a fixed weight for the type of the weight, the weight generating section 124 applies a predetermined fixed weight to the reference signals generated in the reference signal generating section 123, based on the information output from the memory section 122.

Also, when the transmission method determining section 101 selects an adaptive weight for the type of the weight, the weight generating section 124 does not apply a weight to the reference signal generated in the reference signal generating section 123. In this case, the weight generating section 124 generates an adaptive weight based on channel state information that is fed back from the user terminal, and applies this adaptive weight to the data signal. Alternatively, the weight generating section 124 may generate an adaptive weight by estimating the channel state based on a reference signal that is transmitted from the user terminal by applying a transmitting weight calculated in the subject user terminal, and apply this adaptive weight to the data signal.

Note that, although FIG. 9 shows a case where the weights generated in the weight generating section 124 are output to the transmitting signal generating section 131 and where transmitting signals are multiplied by these weights in the transmitting signal generating section 131, it is equally possible to provide the weight generating section 124 with the function of multiplying transmitting signals by weights. Also, when a plurality of transmission streams are transmitted, the weight generating section 124 generates a plurality of weights in accordance with each stream.

The transmitting signal generating section 131 generates transmitting signals based on the transmission method determined in the transmission method determining section 101. For example, when applying fixed weights, the transmitting signal generating section 131 generates data signals and reference signals to which predetermined fixed weights are applied. Also, when a plurality of streams are transmitted, the transmitting signal generating section 131 generates data signals and reference signals to match the number of streams.

The transmission control section 132 controls the transmission timing of the transmitting signals and so on based on transmission control information (scheduling information). The signal transmitting section 133 transmits the data signals and the reference signals generated in the transmitting signal generating section 131 based on commands from the transmission control section 132.

The signal receiving section 141 receives the signals transmitted from the user terminal. Also, the signal receiving section 141 controls the reception of the signals based on information (timing and so on) output from the reception control section 142. The received signal generating section 143 generates the signals received in the signal receiving section 141. For example, when the user terminal transmits a signal by applying beamforming, the received signal generating section 143 generates the received signal based on a receiving weight generated from the channel state.

The channel information acquiring section 105 acquires information about the channel state sent from the user terminal. For example, when beamforming is not applied to the reference signal transmitted from the MM base station, the user terminal feeds back the result of performing channel estimation (channel state information) by using the reference signal to which beamforming is not applied, to the MM base station. Alternatively, the user terminal transmits the reference signal, to which a transmitting weights calculated in the subject user terminal is applied, to the MM base station. Consequently, the channel information acquiring section 105 acquires the channel state information sent from the user terminal, and outputs this to the weight generating section 124. Note that, when a signal (UL signal) is multiplied by a weight and applied beamforming on the user terminal side, a structure to provide a receiving weight generating section to generate a receiving weight in the receiving section 104 may be used.

Figure 11:
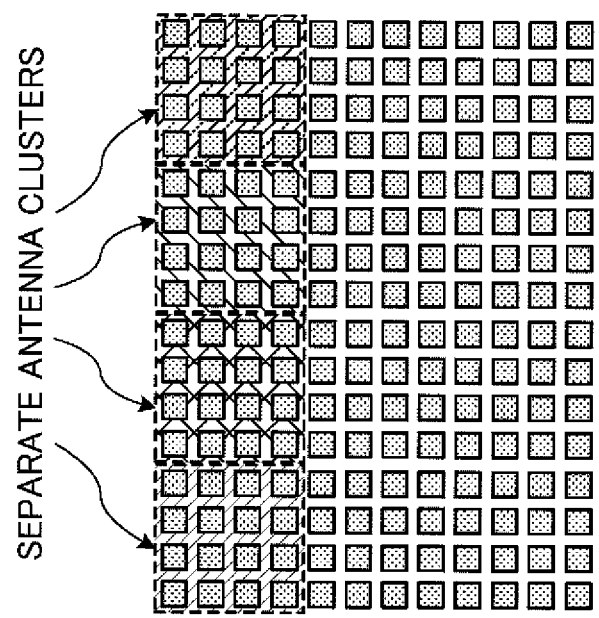
FIG. 11 is a diagram to show example of an antenna that is applicable to the present embodiment.

Note that, with the present embodiment, the antenna to employ in beamforming has a plurality of antenna elements. Note that, for the antenna according to the present embodiment, as shown in FIG. 11, a plurality of antenna elements may be used as one virtual antenna (antenna cluster). In this way, when a sufficient number of antenna elements are provided, beamforming gain can be achieved effectively by constituting one virtual antenna with a plurality of antenna elements. As a result of this, highly accurate channel estimation becomes possible. For example, when adaptive weights are selected as the type of weights, it becomes possible to generate weights that match channel states.

Next, the structure of the user terminal will be described with reference to FIG. 10. The user terminal has a receiving section 201, a weight acquiring section 202 and a transmitting section 203. The receiving section 201 is a block to perform receiving processes, and, to be more specific, includes a signal receiving section 211, a reception control section 212 and a received signal generating section 213. The weight acquiring section 202 is a block to acquire weights, and, to be more specific, includes a control section 221, a memory section 222, a channel information acquiring section 223 and a transmitting/receiving weight generating section 224. The transmitting section 203 is a block to perform transmission processes, and, to be more specific, includes a transmitting signal generating section 231, a transmission control section 232 and a signal transmitting section 233.

The signal receiving section 211 receives signals transmitted from the MM base station or the macro base station (data signals, reference signals and so on). Also, the signal receiving section 211 controls the reception of signals based on information (timing and so on) output from the reception control section 212. The received signal generating section 213 generates the signals received in the signal receiving section 211. For example, when the MM base station transmits signals by applying beamforming, the received signal generating section 213 generates the received signals based on receiving weights that are output from the transmitting/receiving weight generating section 224.

The control section 221 controls channel estimation based on information about the data signal transmission method transmitted from the MM base station (the type of weights applied, the number of streams transmitted, etc.). The channel information acquiring section 223 performs channel estimation based on the channel estimation reference signal reported from the MM base station. At this time, it is possible to reduce the load of the channel estimation operation by using the information (the type of weights, the number of streams transmitted, etc.) reported from the control section 221.

The transmitting/receiving weight generating section 224 generates transmitting/receiving weights based on information that is output from the channel information acquiring section. For example, when a fixed weight is applied to the channel estimation signal, the transmitting/receiving weight generating section 224 generates a receiving weight by using the reference signal to which the fixed weight is applied. The memory section 222 holds information about the transmission method output from the control section 221, information about the transmitting/receiving weights generated in the transmitting/receiving weight generating section 224 and so on. Also, the information about the transmitting/receiving weights generated in the transmitting/receiving weight generating section 224 is output to the received signal generating section 213, the transmitting signal generating section 231 and so on.

The transmitting signal generating section 231 generates transmitting signals. Note that, when signals are transmitted from the user terminal by applying beamforming, transmitting weights that are generated in the transmitting/receiving weight generating section 224 are applied. Also, when beamforming is not applied to a reference signal transmitted from the MM base station, the transmitting signal generating section 231 generates the result of performing channel estimation by using this reference signal (channel state information).

The signal transmitting section 233 transmits the feedback information and data signals generated in the transmitting signal generating section 231 based on commands from the transmission control section 232. The transmission control section 232 controls the transmission timing of the transmitting signals and so on, based on the transmission control information (scheduling information) reported from the MM base station or the macro base station.

The present invention is by no means limited to the above embodiment and can be implemented in various modifications. For example, it is possible to adequately change the number of carriers, the bandwidth of carriers, the signaling method, the number of processing sections, the order of processes and so on in the above description, without departing from the scope of the present invention, and implement the present invention. Besides, the present invention can be implemented with various changes, without departing from the scope of the present invention.

The disclosure of Japanese Patent Application No. 2013-184655, filed on Sep. 6, 2013, including the specification, drawings and abstract, is incorporated herein by reference in its entirety.

The invention claimed is:

1. A radio base station that transmits a data signal to a user terminal by applying beamforming using a plurality of antenna elements,
the radio base station comprising:
a processor that:
determines a type of a weight to apply to the data signal for beamforming;
generates a reference signal which the user terminal uses in channel estimation; and
controls weights to apply to transmitting signals; and
a transmitter that transmits the data signal and the reference signal,
wherein the processor determines whether or not to apply a weight to the reference signal based on the type of the weight that is output from a memory, and
wherein the type of the weight indicates a fixed weight to define a predetermined weight in advance and an adaptive weight to generate a weight based on channel state information transmitted from the user terminal.

2. The radio base station according to claim 1, wherein:
the processor determines the number of streams to apply to the transmission of the data signal, in addition to the type of the weight; and
the processor generates reference signals to match the number of streams.

3. The radio base station according to claim 1, wherein, when the processor selects a fixed weight as the type of the weight, the processor applies predetermined fixed weights to the reference signal and the data signal, and the transmitter transmits the reference signal and the data signal to which the predetermined fixed weights are applied.

4. The radio base station according to claim 3, wherein the predetermined fixed weights are fixed weights applied to synchronization signals which the user terminal detects upon cell search.

5. The radio base station according to claim 1, wherein, when the processor selects an adaptive weight as the type of the weight, the transmitter transmits the reference signal without applying beamforming, and the processor generates weights based on channel state information that is fed back from the user terminal in response to a reference signal to which beamforming is not applied, and applies the generated weight to the data signal.

6. The radio base station according to claim 2, wherein, when the processor selects a plurality of streams, the transmitter orthogonalizes and transmits reference signals corresponding to each stream.

7. The radio base station according to claim 6, wherein, when the processor selects a fixed weight as the type of the weight and also selects the plurality of streams, the processor applies varying weights to reference signals and data signals corresponding to each stream.

8. The radio base station according to claim 2, wherein the transmitter reports information about the type of the weight and/or the number of streams to the user terminal.

9. A user terminal that receives a data signal to which beamforming is applied and which is transmitted from a radio base station comprising a plurality of antenna elements, the user terminal comprising:
 a receiver that receives a reference signal transmitted from the radio base station that determines whether or not to apply a weight to the reference signal based on a type of a weight;
 a processor that:
  acquires channel state information based on the reference signal;
  generates a receiving weight based on the channel state information and causes a memory to store the receiving weight; and
  controls feedback of the channel state information based on a type of the reference signal transmitted from the radio base station
 wherein the type of the weight indicates a fixed weight to define a predetermined weight in advance and an adaptive weight to generate a weight based on channel state information transmitted from the user terminal.

10. A radio communication method for a radio base station that comprises a plurality of antenna elements and a user terminal that receives a data signal to which beamforming is applied and which is transmitted from the radio base station, the radio communication method comprising, in the radio base station, the steps of:
 determining a type of a weight to apply to the data signal for beamforming;
 generating a reference signal which the user terminal uses in channel estimation;
 determining whether or not to apply a weight to the reference signal based on the type of the weight; and
 transmitting the data signal and the reference signal,
 wherein the type of the weight indicates a fixed weight to define a predetermined weight in advance and an adaptive weight to generate a weight based on channel state information transmitted from the user terminal, and
 wherein, when the type of the weight is a fixed weight, the reference signal and the data signal are applied predetermined weights and transmitted, and, when the type of the weight is an adaptive weight, the reference signal is transmitted without being applied beamforming.

11. The radio base station according to claim 2, wherein, when the processor selects a fixed weight as the type of the weight, the processor applies predetermined fixed weights to the reference signal and the data signal, and the transmitter transmits the reference signal and the data signal to which the predetermined fixed weights are applied.

12. The radio base station according to claim 2, wherein, when the processor selects an adaptive weight as the type of the weight, the transmitter transmits the reference signal without applying beamforming, and the processor generates weights based on channel state information that is fed back from the user terminal in response to a reference signal to which beamforming is not applied, and applies the generated weight to the data signal.

* * * * *